US006052662A

United States Patent [19]

Hogden

[11] Patent Number: 6,052,662

[45] Date of Patent: Apr. 18, 2000

[54] SPEECH PROCESSING USING MAXIMUM LIKELIHOOD CONTINUITY MAPPING

[75] Inventor: John E. Hogden, Santa Fe, N.Mex.

[73] Assignee: Regents of the University of California, Los Alamos, Mexico

[21] Appl. No.: 09/015,597

[22] Filed: Jan. 29, 1998

Related U.S. Application Data

[60] Provisional application No. 60/036,061, Jan. 30, 1997.

[51] Int. Cl.[7] ...................................................... G01L 11/00

[52] U.S. Cl. .......................... 704/256; 704/238; 704/239; 704/203

[58] Field of Search .................................... 704/231, 236, 704/238, 240, 239, 203

[56] References Cited

U.S. PATENT DOCUMENTS 4,980,917 12/1990 Hutchins ................................ 704/254

OTHER PUBLICATIONS

Juergen Schroeter and Man Mohan Sondhi, "Techniques for Estimating Vocal–Tract Shapes from the Speech Signal," IEEE Transactions on Speech and Audio Processing, vol. 2, No. 1, Part II, Jan. 1994, pp. 133–150.

R.C. Rose, J. Schroeter, and M.M. Sondhi, "The Potential Role of Speech Production Models in Automatic Speech Recognition," J. Acoustical Society of America, vol. 99, No. 3, Mar. 1996, pp. 1609–1709.

Joseph S. Perkell, Marc H. Cohen, Mario A. Svirsky, Melanie L. Matthies, Inaki Garabieta and Michel T. T. Jackson, "Electromagnetic Midsagittal Articulometer Systems for Transducing Speech Articulatory Movements," J. Acoustical Society of America, vol. 92, No. 6, Dec. 1992, pp. 3078–3096.

Sharlene A. Liu, "Landmark Detection for Distinctive Featured–Based Speech Recognition," J. Acoustical Society of America, vol. 100, No. 5, Nov. 1996, pp. 3417–3430.

John Hogden, Anders Lofqvist, Vince Gracco, Igor Zlokarnik, Philip Rubin, and Elliot Saltzman, "Accurate Recovery of Articulator Positions from Acoustics: New conclusions Based on Human Data," J. Acoustical Society of America, vol. 100, No. 3, Sep. 1996, pp. 1819–1834.

Li Deng and Don X. Sun, "A Statistical Approach to Automatic Speech Recognition using the Atomic Speech Units Constructed From Overlapping Articulatory Features," J. Acoustical Society of America, vol. 95, No. 5, Part 1, May 1994, pp. 2702–2719.

John Hogden, Philip Rubin, and Elliot Saltzman, "An Unsupervised Method for Learning to Track Tongue Position from an Acoustic Signal," Bulletin de la communication parlee n° 3, pp. 101–116.

Robert M. Gray, "Vector Quantization," IEEE ASSP Magazine, Apr. 1984, pp. 4–29.

John Hogden, "A Maximum Likelihood Approach To Estimating Articulator Positions From Speech Acoustics," LA–UR–96–3518, pp. 1–24. Pages Missing.

Zlokarnik "Adding articulatory features to acoustic features for automated speech recognition" The 129th meeting of the acoustical society of america p. 3246, Jun. 3, 1995.

(List continued on next page.)

*Primary Examiner*—David R. Hudspeth
*Assistant Examiner*—Harold Zintel
*Attorney, Agent, or Firm*—Ray G. Wilson

[57] ABSTRACT

Speech processing is obtained that, given a probabilistic mapping between static speech sounds and pseudo-articulator positions, allows sequences of speech sounds to be mapped to smooth sequences of pseudo-articulator positions. In addition, a method for learning a probabilistic mapping between static speech sounds and pseudo-articulator position is described. The method for learning the mapping between static speech sounds and pseudo-articulator position uses a set of training data composed only of speech sounds. The said speech processing can be applied to various speech analysis tasks, including speech recognition, speaker recognition, speech coding, speech synthesis, and voice mimicry.

8 Claims, 8 Drawing Sheets

OTHER PUBLICATIONS

Parthanarathy et al "Articulatory analysis and synthesis of speech" Computer speech language p. 760–764, 1992.

Hodgen et al "Unsupervised method for learning to track tongue position from an acoustic signal" 123rd Meeting of the acoustical society of america, May 15, 1992.

Deng et aL "A statistical approach to automatic speech recognition using the atomic speech units constructed from overlapping articulatory features" J Acoust. Soc pp. 2702–2719, May 1994.

Parthhasarathy et al "On automatic estimation of articulatory parameters in a text–to–speech system" Computer and Speech Language, pp. 37–75, 1992.

Deller et al "Discrete–time processing of speech signals" Prentice Hall, p. 621, 1987.

SPEECH PROCESSING USING MAXIMUM LIKELIHOOD CONTINUITY MAPPING

This application claims the benefit of priority from U.S. Provisional Application Ser. No. 60/036,061, filed Jan. 30, 1997.

This invention relates to estimating the probability of sequences and to speech processing, and, more particularly, to using a mapping between speech acoustics and pseudo-articulator positions for further speech processing. This invention was made with government support under Contract No. W-7405-ENG-36 awarded by the U.S. Department of Energy. The government has certain rights in the invention.

BACKGROUND OF THE INVENTION

Determining the probability of data sequences is a difficult problem with several applications. For example, if a sequence of medical procedures seems unlikely we might want to determine whether the performing physician is defrauding the medical insurance company. In addition, if the sequence of outputs from sensors on a nuclear facility or car are improbable, it might be time to check for component failure. While there are many possible applications, this description of the invention will focus mostly on speech processing applications.

Current speech recognition algorithms use language models to increase recognition accuracy by preventing the programs from outputting nonsense sentences. The grammars currently used are typically stochastic, meaning that they are used to estimate the probability of a word sequence—a goal of the present invention. For example, in order to determine the probability of the sentence "the cow's horn honked", an algorithm might use stored knowledge about the probability of "cow's" following "the", "horn" following "cow's", and "honked" following "horn". Grammars such as these are called bigram grammars because they use stored information about the probability of two-word sequences.

Notice that, although cow's horns typically do not honk, a bigram grammar would consider this a reasonable sentence because the word "honk" frequently follows "horn". This problem can be alleviated by finding the probabilities of longer word sequences. A speech recognition algorithm using the probabilities of three-word sequences (trigrams) would be unlikely to output the example sentence because the probability of the sequence "cow's horn honked" is small. Using four, five, six, etc.-word sequences should improve recognition even more.

While it is theoretically possible to calculate the probabilities of all three-word sequences or four-word sequences, as the length of the word sequence increases, the number of probabilities that have to be estimated increases exponentially, i.e., if there are N words in the grammar then we need to estimate N*N probabilities for a bigram grammar, N*N*N probabilities for a trigram grammar, etc. IBM made a trigram grammar for a 20,000 word vocabulary for the TANGORA speech recognition system. To do this, IBM used 250 million words of training text. To give a better idea of the size of a 250 million word training text, consider that the complete works of Shakespeare contain roughly 1 million words. Even a 250 million word training set, which is on the order of a hundred times the size of the complete works of Shakespeare, was too small. After all, at least 20,0003 words are needed to make a trigram grammar for a 20,000 word vocabulary—on the order of a million times as large as the complete works of Shakespeare. As pointed out in 1989 by the developers of Carnegie Mellon's Sphinx system, developing good language models will probably be a very slow process for speech recognizers because most companies do not have the computer power or databases necessary to make good stochastic grammars for large vocabularies. This is still true today.

The invention described herein allows the probability of a sequence to be estimated by forming a model that assumes that sequences are produced by a point moving smoothly through a multidimensional space called a continuity map. In the model, symbols are output periodically as the point moves, and the probability of producing a given symbol at event t is determined by the position of the point at event t. This method of estimating the probability of a symbol sequence is not only very different from previous approaches, but has the unique property that when the symbols actually are produced by something moving smoothly, the algorithm can obtain information about the moving object. For example, as discussed below, when applied to the problem of estimating the probability of speech signals, the position of the model's slowly moving point is highly correlated with the position of the tongue, which underlies the production of speech sounds. Because the position of the point is correlated with the position of the speech articulators, a position in the continuity map is sometimes referred to herein as a pseudo-articulator position.

These findings are important because techniques for recovering articulator positions, or pseudo-articulator positions, from acoustics have several potential applications. For example, computer speech recognition is performed more accurately when the computer is provided with information about both articulator positions and acoustics, even when the articulator positions are estimated from speech. Since speaker recognition is a very similar problem to speech recognition, techniques that use information about articulator positions are expected to also improve speaker recognition processes. Furthermore, since articulator positions can be transmitted with relatively few bits/second, speech information can be transmitted using fewer bits/per second if speech sounds are converted to articulator positions, the articulator positions transmitted, and the articulator positions converted back to speech sounds. Finally, the relationship between articulator positions and acoustics may be used to improve speech synthesis or to perform transformations to make one person's voice sound like that of another.

There have been several attempts to take advantage of articulation information to improve speech recognition (Rose, Schroeter & Sondhi, 1996). Some researchers have obtained improvements in speech recognition performance by building knowledge about articulation into hidden Markov models (HMMs) (Deng & Sun, 1994), or by learning the mapping between acoustics and articulation using concurrent measurements of speech acoustics and human speech articulator positions (Zlokarnik, 1995). Others have worked toward incorporating articulator information by using forward models (articulatory speech synthesizers) to study the relationship between speech acoustics and articulation (Schroeter & Sondhi, 1994).

However, prior art methods of learning the mapping between speech sounds and articulator positions are inadequate. The theory of linear prediction shows that, given certain strict assumptions about the characteristics of vocal tracts and the propagation of sound through acoustic tubes, equations can be derived that allow the recovery of the shape of the vocal tract from speech acoustics for some speech sounds. However, not only is linear prediction theory inapplicable to many common speech sounds (e.g., nasals, fricatives, stops, and laterals), but when the assumptions underlying linear prediction are relaxed to make more realistic models of speech production, the relationship between acoustics and articulation becomes mathematically intractable.

Techniques for recovering the articulator positions by learning the mapping from acoustics to articulation from a data set consisting of simultaneously collected measurements of articulator positions and speech sounds also have problems. While it is easy to collect recordings of speech, it is very difficult to obtain measurements of articulator positions while simultaneously recording speech. In fact, with the current technology, it is impossible to measure some potentially important information about articulator positions (e.g., the three dimensional shape of the tongue) while also recording speech sounds.

Even using articulatory synthesizers to create speech sounds, and then learning the mapping from the synthesized speech to the articulatory model parameters is problematic. Currently available articulatory synthesizers make many simplifying assumptions that can lead to marked differences between synthesized and actual speech and also call into question the accuracy of the acoustic/articulatory mapping derived from articulatory models. In fact, the mapping between speech acoustics and speech articulation for articulatory speech synthesizers is strongly dependent on assumptions underlying the synthesizers and appears to differ in important ways from the mapping observed for human speech production.

Even attempts to use statistical learning techniques to learn (or at least use) relationships between speech sounds and articulator positions, particularly for speech recognition, have been insufficient due to lack of knowledge about articulation. For example, some researchers have attempted to build constraints into HMMs to make the models infer information about articulation as a step toward speech recognition, but the constraints used in current systems "are rather simplistic and contain several unrealistic aspects" (Deng & Sun, 1994, p. 2717). The fact that the constraints are unrealistic is a serious problem, because, as more assumptions about articulator motions are built into existing models, there is a greater chance of incorporating invalid constraints and potentially decreasing recognition performance.

One previous technique, continuity mapping, shares a desirable characteristic with the invention described herein: continuity mapping allows the mapping from speech sounds to articulator positions to be estimated using only acoustic speech data. However, continuity mapping in the prior art requires only that adjacent sounds be made by adjacent articulator positions, i.e., a speaker cannot move articulators in a disjointed manner. But continuity mapping can not estimate the probability of speech sequences given articulator trajectories, find the mapping that maximizes the probability of the data, or find the smooth path that maximizes the probability of a data sequence (and therefore minimizes the number of bits that need to be transmitted in addition to the smooth paths). Furthermore, continuity mapping estimates of articulator positions are not nearly as accurate as the estimation of articulator positions in accordance with the present invention (Hogden, 1996).

Accordingly, an object of the present invention is to provide a sequence of representations, called pseudo-articulator positions, that provide a maximum probability of producing an input sequence of speech sounds.

REFERENCES INCORPORATED HEREIN BY REFERENCE

Deng, L., & Sun, D. (1994). A statistical approach to automatic speech recognition using the atomic speech units constructed from overlapping articulatory features. *Journal of the Acoustical Society of America,* 95(5), 2702–2719.

Gray, R. (1984). Vector Quantization. *IEEE Acoustics, Speech, and Signal Processing Magazine,* 4–29.

Hogden, J. (1996). *A maximum likelihood approach to estimating articulator positions from speech acoustics* (LA-UR-96-3518). Los Alamos, N.Mex.: Los Alamos National Laboratory.

Hogden, J., Zlokarnik, I., Lofqvist, A., Gracco, V., Rubin, P., & Saltzman, E. (1996). Accurate recovery of articulator positions from acoustics—new conclusions based on human data. *Journal of the Acoustical Society of America,* 100(3).

Liu, S. (1996). Landmark detection for distinctive feature based speech recognition. *Journal of the Acoustical Society of America,* 100(5), 3417–3430.

Perkell, J., Cohen, M., Svirsky, M., Matthies, M., Garabieta, I., & Jackson, M. (1992). Electromagnetic midsagittal articulometer systems for transducing speech articulatory movements. *Journal of the Acoustical Society of America,* 92(6), 3078–3096.

Rose, R., Schroeter, J., & Sondhi, M. (1996). The potential role of speech production models in automatic speech recognition. *Journal of the Acoustical Society of America,* 99(3), 1699–1709.

Schroeter, J., & Sondhi, M. (1994). Techniques for estimating vocal-tract shapes from the speech signal. *IEEE Transactions on Speech and Audio Processing,* 2(1), 133–150.

Zlokarnik, I. (1995). Adding articulatory features to acoustic features for automatic speech recognition. *Journal of the Acoustical Society of America,* 97(5 pt. 2), 3246(A).

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the process of this invention may comprise a method for processing data sets. A mapping is found between data in said data sets and probability density functions (PDFs) over continuity map (CM) positions. A new input data sequence is input to the CM and a path is found through the continuity map that maximizes the probability of the data sequence. In a particular application, the data set is formed of speech sounds and the CM is formed in pseudo-articulator space.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1:
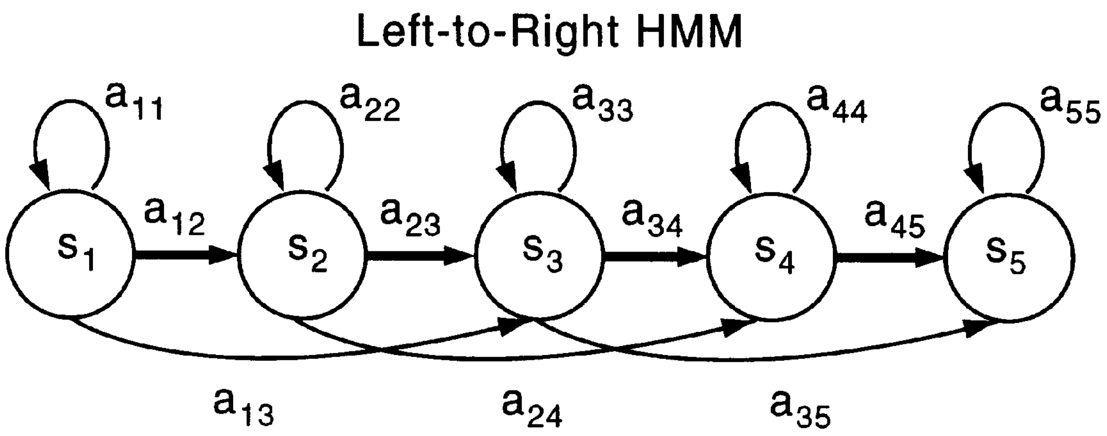
Fig. 1 (Prior Art)
FIG. 1 graphically depicts the operation of prior art Hidden Markov Models for speech recognition.

In accordance with one aspect of the present invention, Maximum Likelihood Continuity Mapping (Malcom), learns the mapping from speech acoustics to pseudo-articulator positions from acoustics alone. Articulator position measurements are not used even during training. Specifically, for each value of a categorical variable, e.g., a sound type, a probability density function (PDF) is identified that quantifies the probability of a position in an n-dimensional abstract space called a continuity map given the value of the categorical variable. The set of PDFs over the continuity map is referred to herein as a probablistic mapping between the categorical variable and continuity map positions. As further explained below, each position in the continuity map has some non-zero probability of producing at least one of the categorical values. Then, at least one PDF must be a function that is not a delta function, otherwise each code would deterministically map to only a single point. The present invention is directed to a particular probabilistic mapping, referred to hereafter as a maximum likelihood continuity mapping. Note the difference between a "mapping" and a "map": "map" refers to an abstract space that may or may not include probability density functions, but a "mapping" defines a relationship between two sets.

While "continuity map" is used to designate an abstract space, it is important to realize that positions in the continuity map, and therefore paths through the continuity map are not abstract objects. A path through a d-dimensional continuity map is a d-dimensional time signal that can be transmitted via radio waves, phone lines, and the like. Similarly, the data sets on which Malcom is used can be represented by sequences of symbols or sequences of codes, but these data sets are formed of physical signals (e.g., sound sequences, phoneme sequences, letter sequences, symbol sequences, word sequences, and the like) or sequences of transactions (e.g., financial transactions, medical procedures, and the like).

As a final note on usage, "mapping" may be used as either a noun or a verb. The usage context will make the distinction evident herein.

Unlike Linear Predictive Coding, which attempts to make the problem of recovering vocal tract shapes from speech acoustics tractable by using problematic simplifications, the assumptions underlying Malcom are well-founded. The term "pseudo-articulator positions" does not mean that "actual" articulator positions are obtained, but only that constraints associated with articulator motions are imposed on the solutions to the mapping. In fact, it has been shown that the resulting pseudo-articulator mapping is closely correlated with actual articulator motions. In fact, the main (and surprisingly powerful) constraint used by Malcom is that articulator motions produced by muscle contractions have little energy above 15 Hz, which is easily verified using articulator data. The fact that Malcom derives so much about the relationship between acoustics and articulation from so few assumptions is an advantage over current systems.

The application of Malcom to speech processing will be described in part through comparisons between Malcom and prior art HMM speech recognition systems. Thus, a brief description of HMM techniques will be provided first, leading into a discussion of how Malcom is used for speech processing as applied to speech recognition. The discussion of Malcom will be followed by a description of experiments showing that the pseudo-articulator positions recovered by Malcom are highly correlated with actual articulator positions. Following the experiment descriptions, techniques for using Malcom speech processing for applications other than speech recognition will be described.

In a straightforward implementation of the prior art HMM approach, models are made of each word in the vocabulary. The word models are constructed such that the probability that any acoustic speech sample would be produced given a particular word model can be determined. The word model most likely to have created a speech sample is taken to be the model of the word that was actually spoken. For example, suppose some new speech sample, Y, is produced. If $w_i$ is the model for word i, and $w_i$ maximizes the probability of Y given $w_i$, then a HMM speech recognition algorithm would take word i to be the word that was spoken. In other variants of HMM speech recognition, models are made of phonemes, syllables, or other subword units.

FIG. 1 shows a 5 state HMM of a type commonly used for speech recognition. Each of the circles in FIG. 1 represents an HMM state. At any time, the HMM has one active state and a sound is assumed to be emitted when the state becomes active. The probability of sound y being emitted by state $s_i$ is determined by some parameterized distribution associated with state $s_i$ (e.g. a multivariate Gaussian parameterized by a mean and a covariance matrix). The connections between the states represent the possible interstate transitions. For example, in the left-to-right model shown in FIG. 2, if the model is in state $s_2$ at time t, then the probability of being in state $s_4$ at time t+1 is $a_{24}$.

HMM's are trained using a labeled speech data base. For example, the data set may contain several samples of speakers producing the word "president". Using this data, the parameters of the "president" word model (the transition probabilities and the state output probabilities) are adjusted to maximize the probability that the "president" word model will output the known speech samples. Similarly, the parameters of the other word models are also adjusted to maximize the probability of the appropriate speech samples given the models. As the word models more closely match the distributions of actual speech samples (i.e. the probability of the data given the word models increases), the recognition performance will improve, which is why the models are trained in the first place.

Malcom provides better estimates of the distributions of speech data by basing the word models on the actual processes underlying speech production. Consider that speech sounds are produced by slowly moving articulators. If the relationship between articulator positions and speech acoustics is known, information about the articulator positions preceding time t can be used to accurately predict the articulator positions at time t, and therefore better predict the acoustic signal at time t. In accordance with the present invention, maximum likelihood techniques are used for this process.

MALCOM

Figure 2:
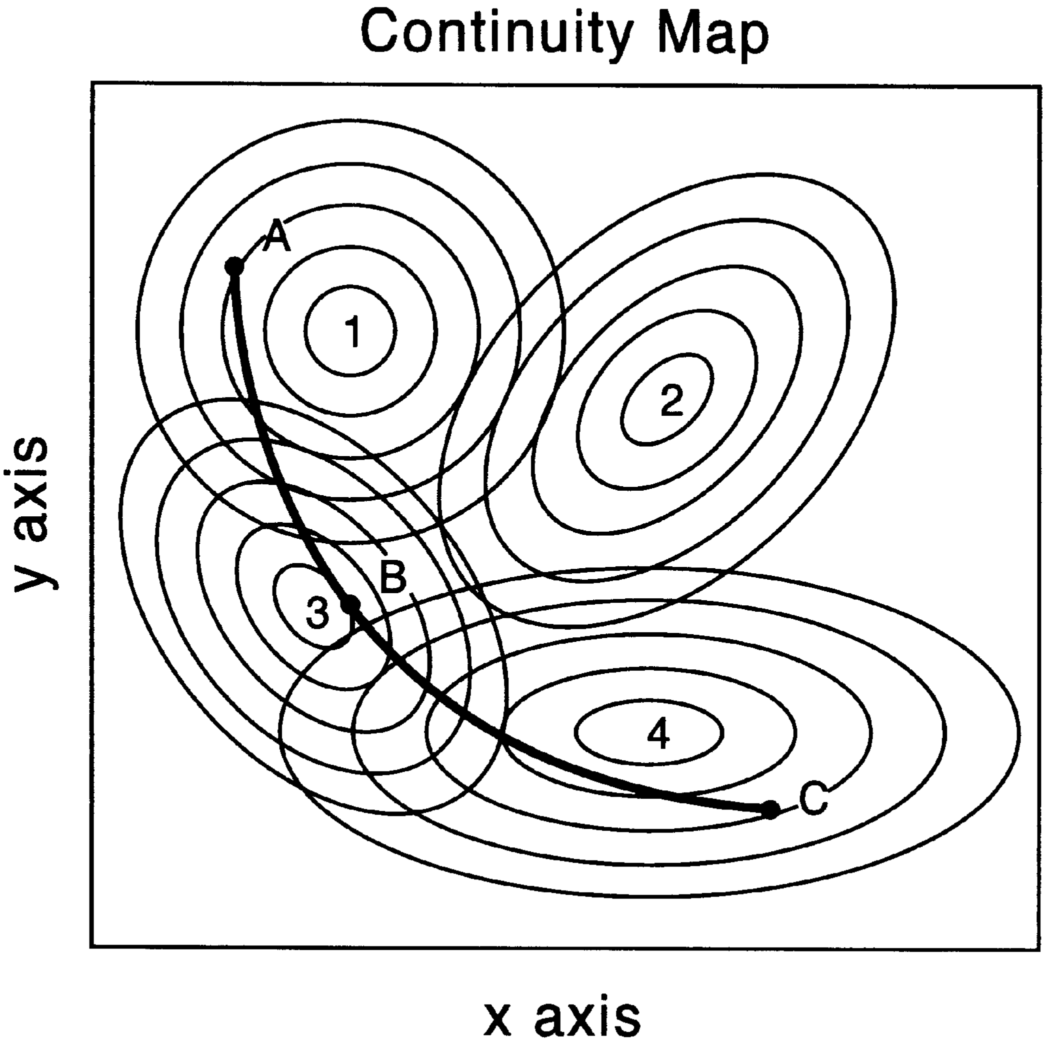
FIG. 2 graphically depicts a hypothetical example of a continuity map as used according to the present invention.

As with HMMs, in order to determine which sequence of words (or phonemes, or diphones, etc.) was most likely to have created the observed data, the probability of the observed data given a word model is determined by Malcom. Malcom uses a model of sequence generation in which sequences are produced as a point moves through an abstract space called a continuity map (CM). FIG. 2 shows a hypothetical continuity map that will be used to explain Malcom. The CM in FIG. 2 is characteristic of a CM used to determine sequences composed of symbols in the set {1, 2, 3, 4}, such as the sequence {1, 4, 4, 3, 2}. In FIG. 1, the set of concentric ellipses around the number "2" are used to represent equiprobability curves of a probability density function (PDF). The PDF gives the probability that a symbol, e.g., "2", will be produced from any position in the CM. Similarly, the ellipses surrounding the numbers 1, 3, and 4, represent equiprobability curves of PDFs giving the probability of producing the symbols "1", "3", and "4", respectively, from any position in the CM.

For ease of exposition, call the smallest ellipse centered around the number i curve $L_{i1}$, the next largest curve $L_{i2}$, etc. In the following discussion it will be assumed that the height of the PDF (on the z axis—not shown in the figure) of $L_{ij}$ is identical to the height of $L_{kj}$, i.e., the curve closest to "1" connects points with the same probability density as the points connected by the curve closest to "2", etc. It will also be assumed that the height of each PDF monotonically decreases radially outward from the center of the PDF.

Note that the CM axes are meaningless in this case, and so are labeled simply "axis x" and "axis y". All that matters is the relative positions of the objects in the CM. In fact, it will later be shown that any rotation, reflection, translation or scaling of the positions of the objects in the CM will be an equally good CM.

From this map, it can be seen that the probability of producing symbol "1" from the point marked "A" is higher than the probability of producing "2", "3", or "4" from position "A", but that there is some probability of producing one of the other symbols from position A. In general, every position in the CM will have some probability of producing each of the symbols, and each sequence of n positions (e.g., positions A, B, C) in the CM has some probability of producing any sequence of n symbols.

To find the probability of a sequence of symbols using Malcom, the sequence of positions of PDFs in the CM that maximizes the probability of the symbol sequence is found, i.e., a mapping is found between the symbols and the PDF positions on the CM. The probability of producing the symbol sequence from the path is used as the estimate of the probability of the sequence.

If all paths through the CM were equally probable, then all sequences which differed only in the order of the symbols would be equally probable. To see why, note that the path which maximizes the probability of the sequence {1, 3, 4} goes (approximately) from the mode of the PDF for symbol "1", to the mode of the PDF for symbol "3", to the mode of the PDF for symbol "4". The path through the CM which maximizes the probability of the sequence {3, 1, 4} goes through the same points just in a different order. From this fact, it is possible to show that the probability of sequence {1, 3, 4} given the first path through the CM will be exactly equal to the probability of sequence {3, 1, 4} given the second path through.

Since it is important to be able to represent the fact that symbol sequences differing in order may have different probabilities, Malcom constrains the possible paths through the CM. As the smooth curve connecting the points "A", "B", and "C" suggests, Malcom as currently embodied requires that paths through the CM are smooth, a physical constraint of articulatory motion. This smoothness constraint could easily be replaced by other constraints for other applications of Malcom (e.g. that the probability of a path goes down as the frequencies increase, or that the paths must all lie on a circle, etc.).

In order to determine the probability of a sequence, Malcom is used to adjust the parameters of the PDFs associated with the symbols in a manner that maximizes the probability of all the data sequences in a known training set. However, since the algorithm for adjusting the PDF parameters uses the technique for finding the path that maximizes the probability of the data, the following invention description will first discuss how the best path is found given a probabilistic mapping, and then discuss how to make a maximum likelihood continuity mapping.

In an exemplary process, the data sets that represent acoustic speech signals are formed as sequences of vector quantization (VQ) codes (Gray, 1984 describes vector quantization) that are derived from speech acoustics. However, sequences of discrete sound types derived using virtually any other technique for categorizing short time-windows of speech acoustics could be used to form data sets that represent the speech acoustics. In a particular embodiment, Malcom is applied to the case where the distribution of pseudo-articulator positions that produce VQ codes is assumed to be Gaussian.

FINDING PSEUDO-ARTICULATORY PATHS THAT MAXIMIZE THE PROBABILITY OF THE OBSERVED DATA

Figure 4A:
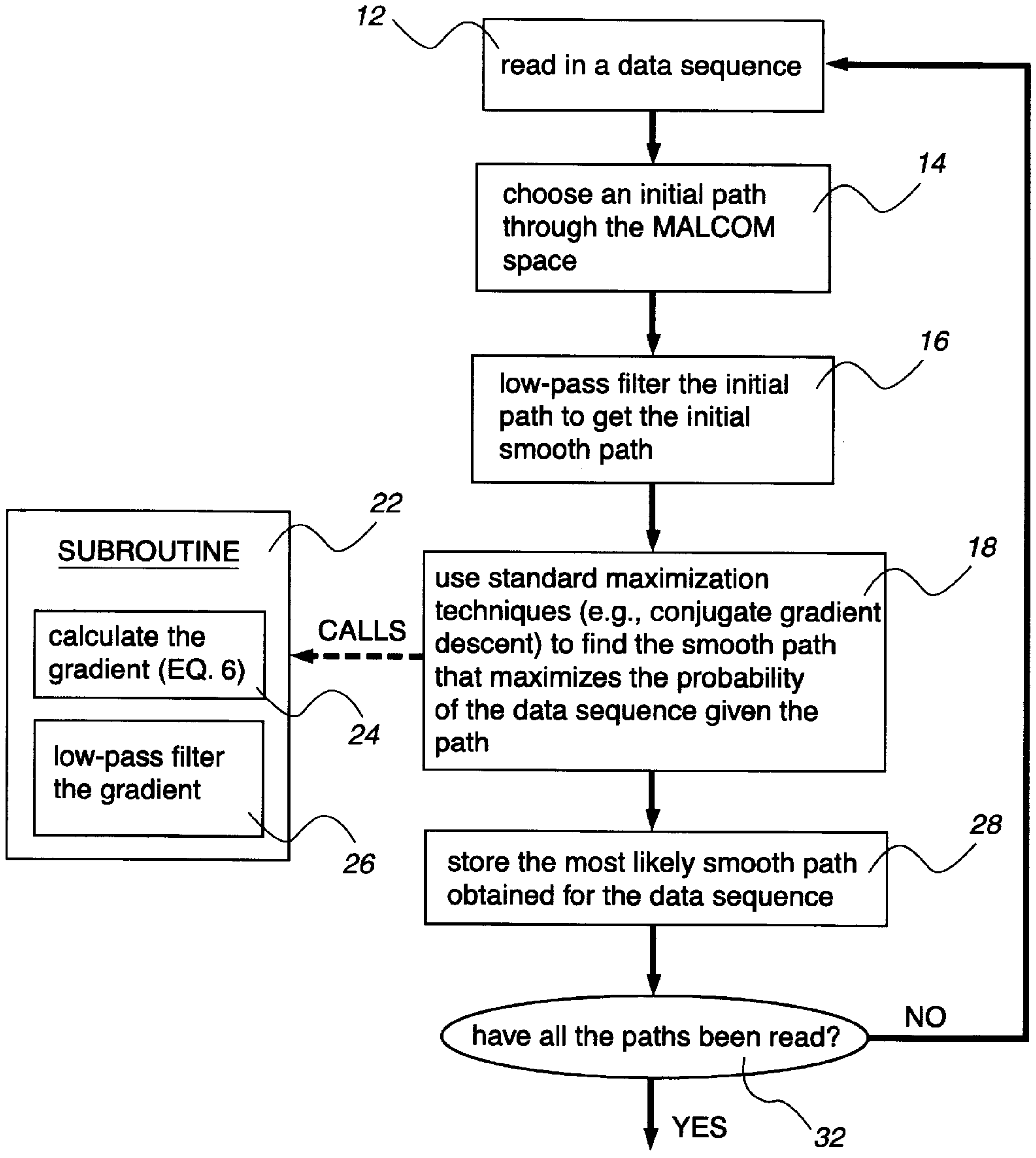
FIGS. 4A–E are flow charts that depict maximum likelihood continuity mapping according to the present invention.
Figure 4B:
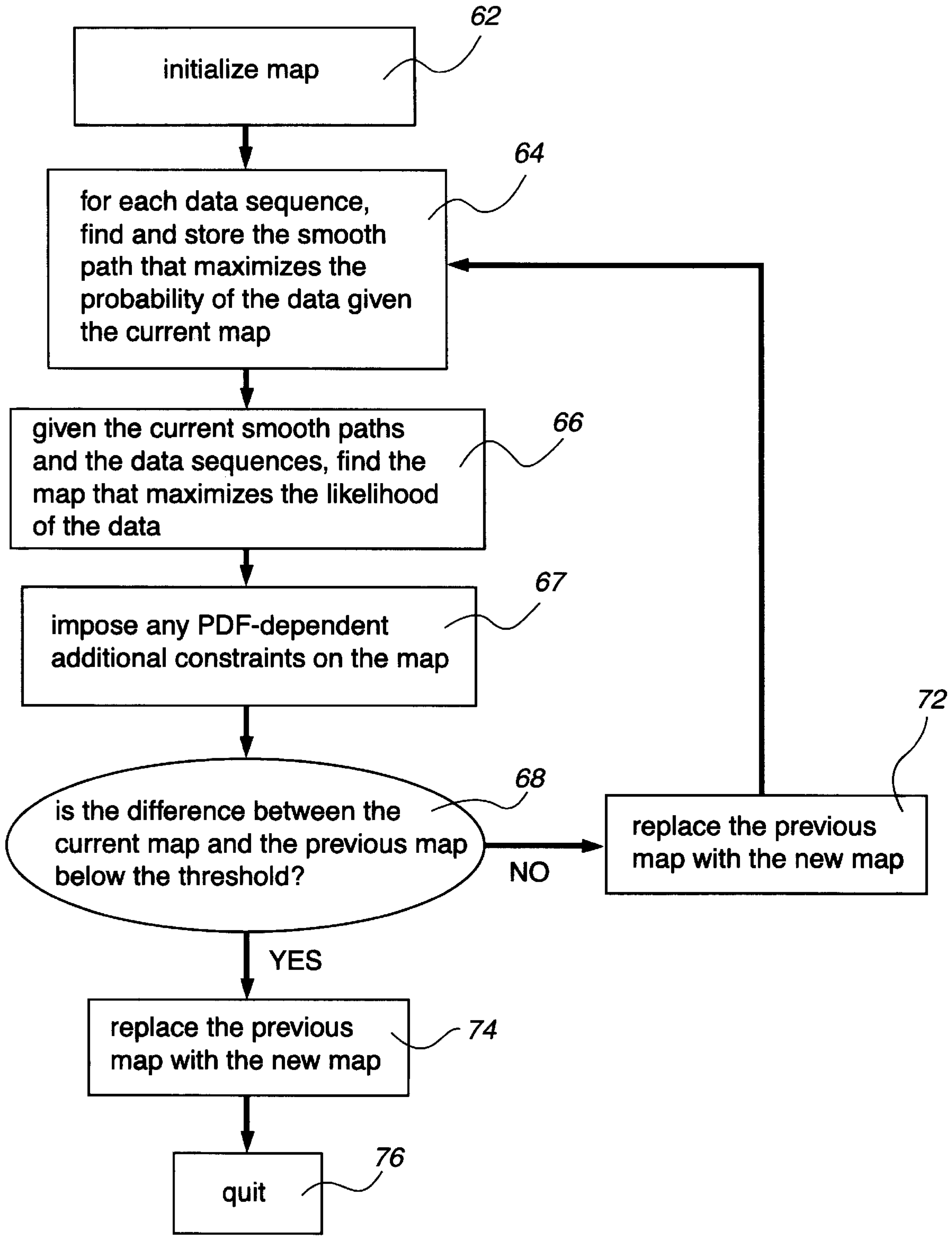

As discussed above, Malcom finds pseudo-articulatory models of words, and these pseudo-articulatory models can be used to estimate the probability of observing a given acoustic speech sequence given the pseudo-articulatory path, where a pseudo-articulatory model of a word is a smooth pseudo-articulatory path that maximizes the conditional probability of the speech sound sequence. This section and the flow charts shown in FIGS. 4A and 4B show how to determine pseudo-articulatory paths corresponding to sound sequences.

The probability of a sequence of speech sounds given a pseudo-articulatory path will be derived by first finding the probability of a single speech sound given a single pseudo-articulator position, and then by combining probabilities over all the speech sounds in a sequence. Next, a technique for finding the pseudo-articulator path that maximizes the conditional probability of a sequence of speech sounds will be described. Finally, the problem is constrained to find the smooth pseudo-articulator path(as opposed to any arbitrary pseudo-articulator path) that maximizes the conditional probability of the data.

The following definitions are used. Let:

$c(t)$=the VQ code assigned to the $t^{th}$ window of speech;

$c=[c(1), c(2), \ldots c(n)]$=a sequence of VQ codes used to describe a speech sample, where n is the number of VQ codes used;

$x_i(t)$=the position of pseudo-articulator i at time t;

$x(t)=[x_1(t), x_2(t), \ldots x_d(t)]$=a vector of the positions of all the pseudo-articulators at time t where d is the number of dimensions in the CM; and $X=[x(1), x(2), \ldots x(n)]$=a sequence of forming a smooth pseudo-articulator path.

Further definitions are needed to specify the mapping between VQ codes and PDFs over pseudo-articulator positions. Let:

$P(c_i)$=the probability of observing code $c_i$ given no information about context;

$P(x|c_i,\phi)$=the probability that pseudo-articulator position x was used to produce VQ code $c_i$, where $\phi$=a set of model parameters (also called probabilistic mapping parameters) that define the shape of the PDF, e.g., $\phi$ could include the mean and covariance matrix of a Gaussian probability density function used to model the distribution of x given c.

Note that many different distributions could be used for $P(x|c_i,\phi)$. For example, computer simulations have been used to argue that many different articulator positions produce the same acoustic signal. Although the limited research on human speech production data argues that articulator positions can be recovered from acoustics much more accurately than computer simulations suggest, if there are multimodal distributions of articulator positions that can be used to produce identical acoustic signals, then it may be necessary to specify $P(x|c_i,\phi)$ as a mixture of Gaussians.

With these definitions, the probability of observing code $c_j$, given that the pseudo-articulator position vector is x with model parameters $\phi$, is determined using Bayes' Law as:

$$P(c_j|x,\varphi) = \frac{P(c_j,x|\varphi)}{P(x|\varphi)} = \frac{P(c_j,x|\varphi)}{\sum_i P(c_i,x|\varphi)} = \frac{P(x|c_j,\varphi)P(c_j)}{\sum_i P(x|c_i,\varphi)P(c_i)} \quad \text{Eq. 1}$$

The probability of the code sequence can be determined by assuming conditional independence, i.e., $$P[c|X,\varphi] = \prod_{t=0}^{n} P[c(t)|x(t),\varphi] \quad \text{Eq. 2}$$

For an application to speech processing, conditional independence implies that the probability of producing a given sound, or VQ code, is wholly dependent on the current tongue position without any regard to the previous tongue position.

Note that the probability of observing a code is not assumed to be independent of the preceding and subsequent codes; it is only assumed to be conditionally independent. So if x(t) is dependent on x(t') then c(t) is dependent on c(t'). By using an appropriately constrained model of possible pseudo-articulator paths the sequences of codes can be tightly constrained in a biologically plausible manner.

The goal is to find the sequence of pseudo-articulator positions X that maximizes the conditional probability, $P(c|X,\phi)$, of a sequence of VQ codes, c. A succinct notation for writing "Let $\hat{X}$ be the X that maximizes $P(c|X,\phi)$ is:

$$\hat{X} = \arg\max_X P(c|X,\varphi) \quad \text{Eq. 3}$$

Function maximization is such a useful process that many standard maximization algorithms already exist. While many of the standard algorithms could be used, the more efficient algorithms require calculating the gradient of the function to be maximized. Thus, the gradient with respect to X is derived here.

To simplify the problem of finding $\hat{X}$, note that the X that maximizes $P(c|X,\phi)$ also maximizes $\text{Log}P[c|X,\phi]$. Thus, $\text{Log}P[c|X,\phi]$ is maximized using the gradient of $\text{Log}P[c|X,\phi]$, which is denoted $\nabla\text{Log}P[c|X,\phi]$, to get the maximum likelihood estimate of the pseudo-articulator path that produced c.

This gradient is found by first taking the logarithm of Eq. 2:

$$\text{Log}P[c|X,\varphi] = \sum_t \text{Log}P[c(t)|x(t),\varphi] \quad \text{Eq. 4}$$

Next, substitute Eq. 1 into Eq. 4 and separate the terms in the logarithm to get:

$$\text{Log}P[c|X,\varphi] = \sum_t \{\text{Log}P[x(t)|c(t),\varphi] + \text{Log}P[c(t)] - \text{Log}\sum_i P[x(t)|c_i,\varphi]P[c_i]\} \quad \text{Eq. 5}$$

The gradient of equation 5 is:

$$\nabla\text{Log}P[c|X,\varphi] = \frac{\nabla P[x(t')|c(t'),\varphi]}{P[x(t')|c(t'),\varphi]} - \frac{\sum_i P[c_i]\nabla P[x(t')|c_i,\varphi]}{\sum_i P[x(t')|c_i,\varphi]P[c_i]} \quad \text{Eq. 6}$$

The preceding analysis is general because it ignores constraints on the possible pseudo-articulator paths. Herein, the word "smooth means constrained in some way, e.g., being bandlimited, falling on a hypersphere, or the like. To incorporate biologically plausible constraints on pseudo-articulator motion, only those pseudo-articulator paths are allowed that have all their energy in Fourier components below some cut-off frequency (say 15 Hz, since actual articulator paths have very little energy above 15 Hz). Realizing that a discrete Fourier transform can be considered a rotation to an new set of orthogonal basis vectors, the constraint that the pseudo-articulator path have all of its energy below the cut-off frequency is equivalent to requiring that the path lie on a hyperplane composed of the axes defined by low frequency sine and cosine waves.

From vector calculus, when $\nabla\text{Log}(c|X,\phi)$ is perpendicular to the constraining hyperplane, i.e., has no components below the cut-off frequency, so that $\text{Log}(c|X,\phi)$ can not increase without X traveling off the hyperplane, then a constrained local minimum has been reached. Thus, the smooth path that maximizes the probability of the observed data is the path for which $\nabla\text{Log}(c|X,\phi)$ has no components with energy below the cut-off frequency. This suggests the following process for finding the smooth path that maximizes the probability of the data, as shown in FIG. 4A:

1) read 12 a data sequence;

2) initialize the maximization algorithm by choosing 14 a pseudo-articulator path and low-pass filtering 16 the initial path selected.

3) use standard maximization techniques 18 (e.g., conjugate gradient descent in conjunction with subroutine 22 that calculates 24 the gradient using Eq. 7 and low-pass filters 26 the gradient) to find the smooth path that maximizes the probability of the data given the path;

4) let the maximization algorithm converge 18 to a solution;

5) store 28 the most likely smooth path obtained for the data sequences:

6) repeat 32 steps 12–28 until all of the paths have been read.

A NOTE ON INITIALIZATION

While, theoretically, any smooth path could be used to initialize 14 the maximization algorithm, a solution can be found more quickly if a good initial smooth path can be found. In fact, for many classes of distributions of $P(x|c_i,\phi)$ a good initial path can be found. To find a good initial path, assume the code sequence [5, 2, . . . ]. A path is created by using the mean pseudo-articulator position associated with code 5 as the first point in the path, then the mean pseudo-articulator position associated with code 2 as the second point in the path, etc. Finally, the path is low-pass filtered to ensure that it is smooth.

A NOTE ON LOW-PASS FILTERING

Since it may not be clear what is meant by low-pass filtering a multidimensional path, the goal of this section is to describe this operation in more detail. A way to filter paths is described which will give the same low pass-filtered results regardless of rotations, reflections, or translations of the paths. Consider that, in a path through a d-dimensional space, there are d measurements at each time. It can be shown that low-pass filtering the time series composed of $[x_1(1), x_1(2), \ldots x_1(n)]$ and then low-pass filtering the path composed of $[x_2(1), x_2(2), \ldots x_2(n)]$, etc., until the path has been low-pass filtered on each dimension, will force the path to be low-pass filtered regardless of any rotation, reflection, or scaling of the CM. This result follows because any linear combination of signals having no energy in Fourier components above $f_c$ will have no energy in Fourier components above $f_c$, and rotation, reflection, and scaling are all linear operations.

However, in the hypothetical continuity map shown in FIG. 2, the x-axis components of the path [A,B,C] increase in value from time 1 to time 3, but the CM could easily be rotated and translated so that the x-axis component of the path at times 1 and 3 are 0 and the x-axis component of the path at time 2 is some positive value. This fact affects how the low-pass filtering is performed, because discrete-time filtering theory assumes that the paths are periodic—after the last element of the time series, the series is assumed to restart with the first element of the time series. Thus, by performing simple rotations and translations of the CM, time series are obtained that have large discontinuities or are relatively smooth.

To avoid problems that would arise from the discontinuities, the trend or bias of the time series is removed before smoothing the paths and then added back after the filtering has been performed, i.e., the line connecting the first and last points in the path should be subtracted from the path before filtering and added back after filtering. The trend should also be removed before filtering the gradient and then added back after filtering the gradient.

Figure 4C:
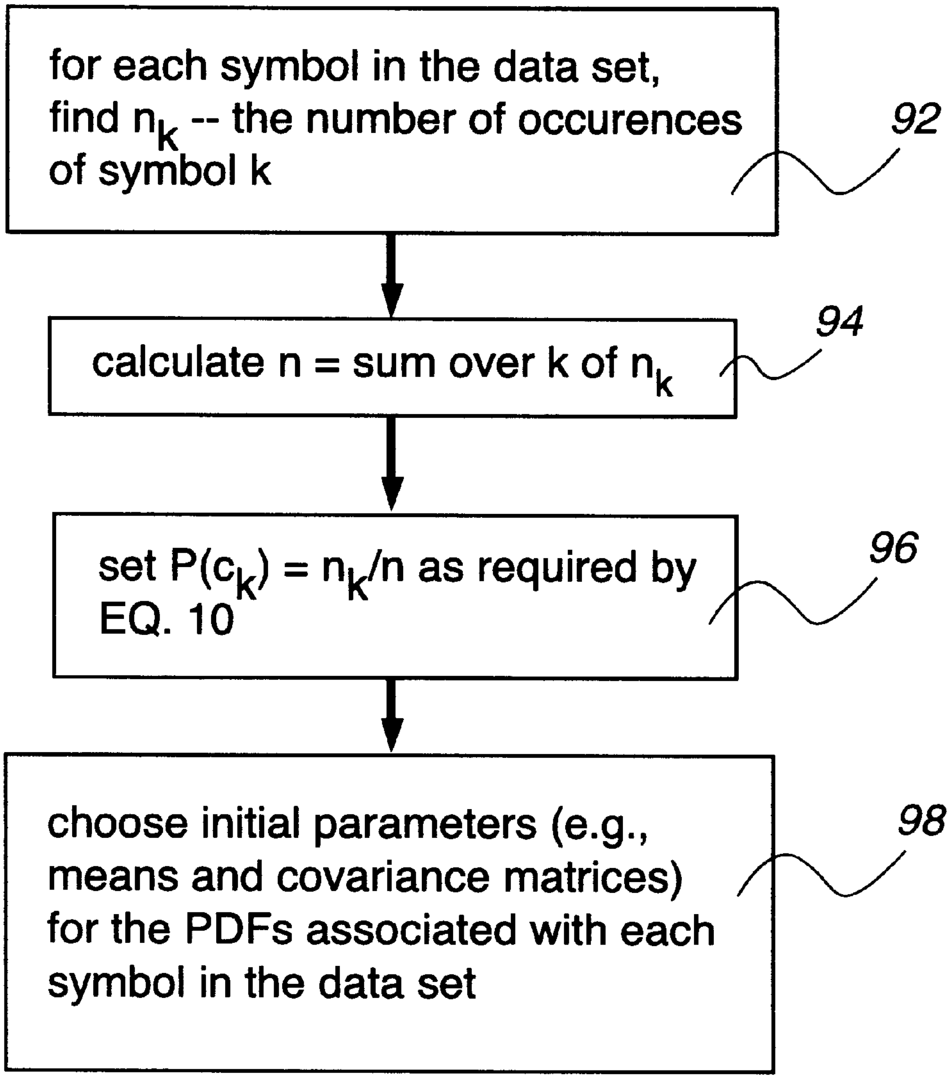
Figure 4D:
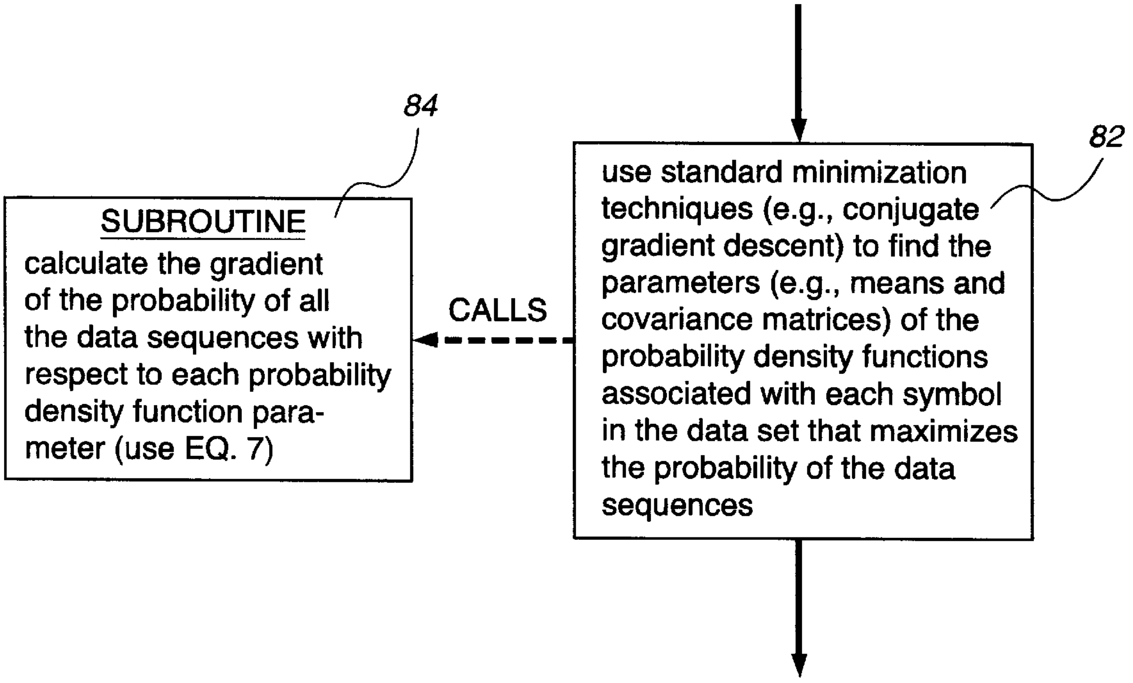
Figure 4E:
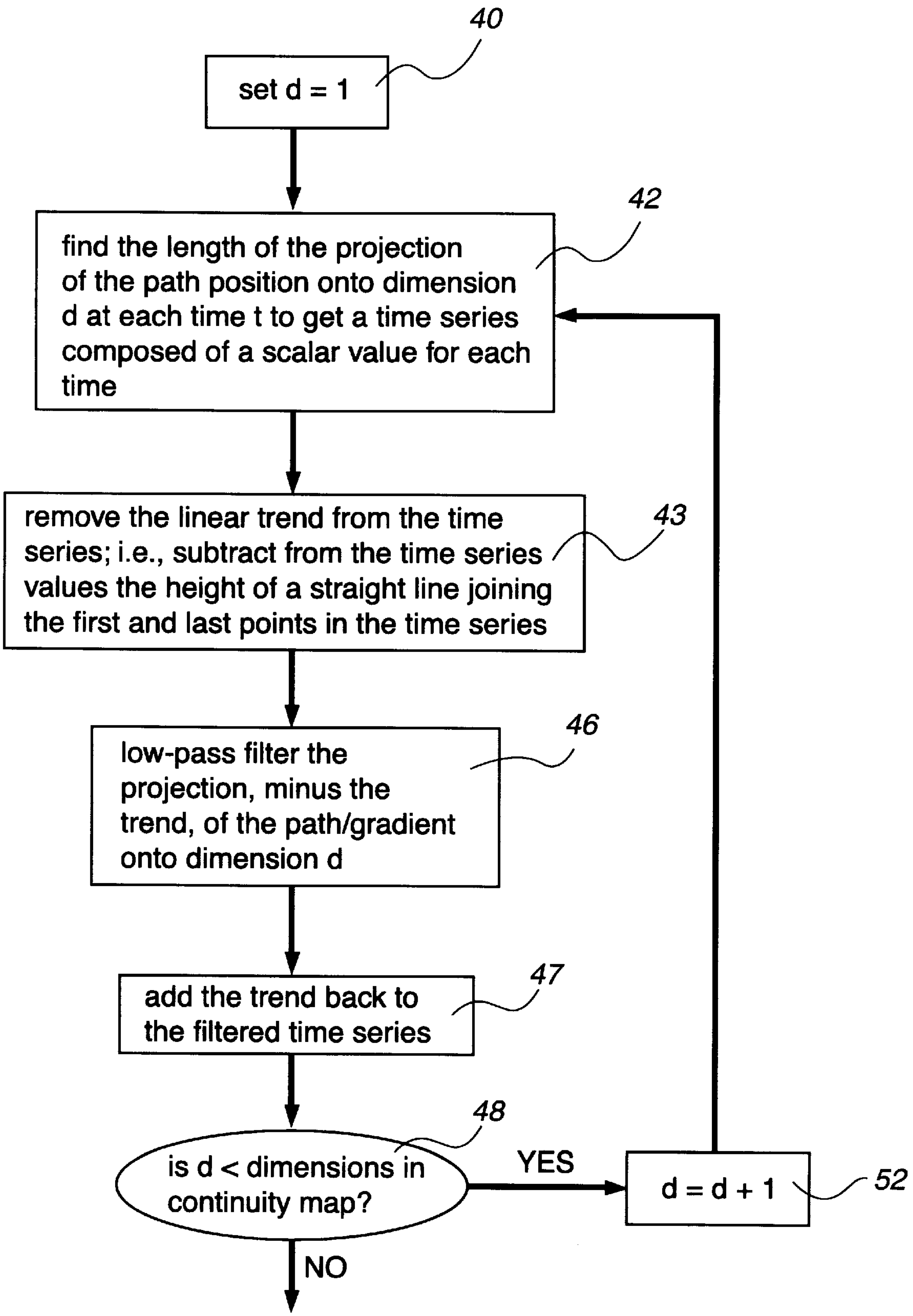

These steps are depicted in the flow chart in FIG. 4E and comprise the low-pass filter process of steps 16, 26 (FIG. 4A):

1) select 40 a first dimension (set d=1);
2) project 42 a path/gradient onto dimension d to find the length of the projection of the path position onto dimension d at each time to get a time series composed of a scalar value of each time;
3) remove 43 the trend of the projected path/gradient, i.e., subtract from the time series values the height of a straight line joining the first and last points in the time series;
4) low-pass filter 46 the projection, less the trend, of the path/gradient onto dimension d;
5) add 47 the trend back to the path/gradient
6) determine 48 if dimensions remain;
7) if so, increment 52 to the next dimension and repeat; if not, complete the process.

FINDING A MAPPING BETWEEN PSEUDO-ARTICULATION AND ACOUSTICS

In the preceding sections, it was assumed that P(c) and $P(x|c,\phi)$ are known. In this section it is shown that these values can be determined using only acoustic data. This is an important aspect of the present invention, because $P(x|c,\phi)$ is a probabilistic mapping from speech sounds to pseudo-articulator positions, and, in accordance with the present invention, this mapping is inferred using training data composed of only data sets that represent acoustic signals, i.e., sequences of VQ codes that are derived from speech sound-pressure waves using standard techniques. The techniques in this section allow a mapping between pseudo-articulator positions and acoustics to be obtained, without inputting possibly faulty knowledge of phonetics into a model, without collecting measurements of articulator positions, and without using potentially inaccurate articulatory synthesizers to learn the mapping from acoustics to articulator positions.

The process of finding the mapping between speech sounds and PDFs over continuity map positions is presented in the flow charts shown in FIGS. 4A–4E. FIG. 4B shows the steps needed to learn the mapping:

1) given a collection of quantized speech signals and some initial estimate 62 of the mapping, use the procedures described herein to find the smooth paths 64 (see FIG. 4A) (one path per sequence) that maximize the conditional probability of the observed data, i.e., for each sequence find:

$$\hat{X} = \arg\max_{X} P(c|X,\varphi)$$

where X is constrained to be smooth;

2) given the smooth paths that maximize the probability of the data sequences, find 66 the PDF parameters, $\phi$ (FIG. 4D) and $P(c_i)$ (FIG. 4C) values, that maximize (or at least increase) the conditional probability of the data set, i.e., find:

$$\hat{\varphi} = \arg\max_{\varphi} \prod_{c} P(c|\hat{X},\varphi) \quad \text{and}$$

$$\hat{P}(c_i) = \arg\max_{\hat{P}(c_i)} \prod_{c} P(c|\hat{X},\varphi)$$

where the products are taken over all data sequences. As discussed below, the $P(c_i)$ values are calculated from the number of each code in the data set. An implication of this is that the $P(c_i)$ values that maximize the conditional probability of the data do not change, and so can be calculated once, at the beginning of the algorithm, as part of the initialization 92–96.

3) Impose 67 on $\phi$ any PDF-dependent additional constraints needed for the particular probability density function used;
4) determine 68 the difference between the values from step 67 and current values;
5) if the difference is not below a threshold difference, replace 72 the previous $\phi$ with the new $\phi$ and repeat steps 64–67 iteratively until a local (possibly global) probability maximum is reached;

6) the $\phi$ that is a local maximum is then stored 74 and the process is completed 76.

Calculation of $\phi$ can be accomplished using standard maximization algorithms. Since maximization algorithms that use gradient information are typically faster than algorithms that do not use the gradient, an expression for $\nabla$Log(c|X,$\phi$) with respect to $\phi$ is derived to aid in maximizing the probability of the data:

$$\nabla \mathrm{Log}P[c|X,\varphi] = \nabla\sum_t \{\mathrm{Log}P[x(t)|c(t),\varphi] + \mathrm{Log}P[c(t)] - \mathrm{Log}\sum_i P[x(t)|c_i]P[c_i]\}$$

$$= \sum_t \left\{ \frac{\nabla P[x(t)|c(t),\varphi]}{P[x(t)|c(t),\varphi]} + \frac{\nabla P[c(t)]}{P[c(t)]} - \frac{\sum_i \nabla\{P[x(t)|c_i,\varphi]P[c_i]\}}{\sum_i P[x(t)|c_i,\varphi]P[c_i]} \right\}$$

concluding with:

$$\nabla \mathrm{Log}P[c|X,\varphi] = \sum_t \left\{ \frac{\nabla P[x(t)|c(t),\varphi]}{P[x(t)|c(t),\varphi]} - \frac{\sum_i \nabla\{P[x(t)|c_i,\varphi]P[c_i]\}}{\sum_i P[x(t)|c_i,\varphi]P[c_i]} \right\} \quad \text{Eq. 7}$$

FIG. 4D illustrates a process using standard techniques 82 (e.g., conjugate gradient) to find the parameters (e.g., means and covariance matrices) of the probability density functions associated with each symbol in the data set that maximized the probability of the data. Subroutine 84 calculates the gradient of the probability of all the data sequences with respect to each probability density function parameter using Eq. 7.

The P(c) values that maximize the probability of the VQ code sequences can be found analytically. To derive the P(c) values, start with the expression for $\nabla$Log(c|X,$\phi$) with respect to P($c_k$):

$$\nabla \mathrm{Log}P[c|X,\varphi] = \sum_{t\in c(t)=c_k} \frac{1}{P[c_k]} - \sum_{t=0}^{n} \left\{ \frac{P[x(t)|c_k,\varphi]}{\sum_i P[x(t)|c_i,\varphi]P[c_i]} \right\} \quad \text{Eq. 8}$$

$$= \frac{n_k}{P[c_k]} - \sum_{t=0}^{n} \left\{ \frac{P[x(t)|c_k,\varphi]}{\sum_i P[x(t)|c_i,\varphi]P[c_i]} \right\}$$

$$= \frac{n_k}{P[c_k]} - \frac{1}{P(c_k)}\sum_t P[c_k|x(t),\varphi]$$

$$\cong \frac{n_k}{P[c_k]} - \frac{1}{P(c_k)}\sum_x P(x)P[c_k|x,\varphi]$$

$$= \frac{n_k}{P[c_k]} - 1$$

where $n_k$ is the number of times $c_k$ is observed in the speech sample. Since the sum of the P(c) values must be 1, finding the P(c) values that maximize the conditional probability of the data is a constrained optimization problem in which the P(c) values are found by using a Lagrange multiplier, $\lambda$, and solving:

$$\frac{n_k}{P(c_k)} - 1 = \lambda\nabla\sum_i P(c_i) = \lambda \quad \text{Eq. 9}$$

From Eq. 9, it can be seen that setting $$P(c_k) = n_k/n \quad \text{Eq. 10}$$

will maximize the conditional probability of the data.

Initial parameters are established as shown in FIG. 4C. For each symbol k in the data set, the number of occurrences, $n_k$, is found 92 for that symbol. Then, n=(sum over k of $n_k$) is calculated 94. The probability $P(c_k)=n_k/n$ of each symbol is set 96 (Eq. 10) and an initial set of parameters (e.g., means and covariance matrices) is chosen 98 for the PDF's associated with each symbol in the data set. This establishes the initial map 62 for use in the process shown in FIG. 4B.

Thus, using only speech acoustics, it is possible to infer a probabilistic mapping between acoustics and pseudo-articulator positions. Furthermore, given speech acoustics and said probabilistic mapping (or a probabilistic mapping created by a different method such as a mapping that is made using measured articulator positions), it is possible to find the pseudo-articulator trajectories most likely to have created the acoustics.

A NOTE ON PDF-DEPENDENT CONSTRAINTS

For most forms of the P(x|c,$\phi$) distributions, there are many different $\phi$ values that will give equally high values of P(c|X,$\phi$). Some of these solutions are degenerate and should be avoided. Examples of simple constraints that can be applied when using Gaussian distributions are discussed in the example derivation below.

CHOOSING THE DIMENSIONALITY AND CUT-OFF FREQUENCY

Even though the probability of the data increases as the dimensionality and/or cut-off frequency of the Malcom solution increase, it clearly is not the case that increasing the dimensionality or cut-off frequency will always give a better solution. While the choice of the dimensionality and cut-off frequency depend in part on the application, one aid to choosing these parameters is the number of bits needed to transmit the data. The number of bits needed to transmit the data is the sum of the number of bits needed to transmit the smooth paths and the number of bits needed to transmit the codes given the smooth paths. It is known from information theory that the number of bits needed to transmit the data given the smooth paths is $$-\sum_i \mathrm{Log}P[c(t)|x(t),\varphi].$$

Notice that the number of bits needed to transmit the smooth paths increases with increasing dimensionality and cut-off frequency (since the number of samples per second increases), whereas the number of bits needed to transmit the data given the smooth paths decreases with increasing dimensionality and cut-off frequency. Thus, the number of bits needed to transmit the data better captures the trade-off between parsimony and accuracy.

EXAMPLE

The above derivation permits many different forms of the P[x(t)|c(t),φ] distributions to be used, in this section the gradient equations are derived for the exemplary case where the distribution of articulator positions that produce sounds quantized by code c is a multivariate Gaussian characterized by the equation:

$$P[x|c,\varphi] = \frac{1}{(2\pi)^{\frac{d}{2}}|\sigma(c)|^{\frac{1}{2}}}\exp\left\{-\frac{1}{2}[x-\mu(c)]^{t}\sigma^{-1}(c)[x-\mu(c)]\right\} \quad \text{Eq. 11}$$

where:

- d is the number of dimensions in the pseudo-articulator space (i.e., the number of pseudo-articulators),
- $\mu$(c) is a vector giving the mean of all the pseudo-articulator positions used to produce sounds quantized with vector quantization code c. For example, $\mu_i$(c), the $i^{th}$ component of the $\mu$(c) vector, may be correlated with the mean lower lip height used to create sounds quantized as code c,
- σ(c) is the covariance matrix of the multivariate Gaussian distribution of pseudo-articulator positions that produce sounds quantized with code c, and
- x is a vector describing a pseudo-articulator configuration.

As mentioned above, the x, $\mu$(c) and σ(c) values that maximize the conditional probability of the data are not unique. For example, suppose x, $\mu$(c), and σ(c) maximize the conditional probability of the data. Let R be an arbitrary matrix and let y be an arbitrary vector. Also let x'=Rx+y, $\mu$'(c)=R$\mu$(c)+y, and σ'(c)=Rσ(c)$R^t$ then the probability of x' given a code and the model is $$P[x'|c,\varphi'] = \frac{1}{|R|}P[x|c,\varphi] \quad \text{Eq. 12}$$

Notice that the probability is only changed by a scaling factor and goes to infinity as the determinant of R goes to 0. Furthermore, if Eq. 12 is substituted into Eq. 1, it can be seen that the conditional probability of the VQ codes is the same for x', $\mu$'(c) and σ'(c) as it was for x, $\mu$(c) and σ(c). Thus, an infinite number of solutions will all be equally good if there are no additional constraints placed on the solutions. Among the solutions that are equally good are rotations, reflections, translations, and scaling of the configuration of $\mu$(c) values. While rotations, reflections, scaling, and translations of the solutions are inconsequential, numerical difficulties can occur if the determinant of R goes to zero. For this reason, it is a good idea to place additional constraints on the solution to prevent degenerate solutions.

There are a variety of simple constraints that can be used to prevent degenerate solutions. In this discussion, the x, $\mu$(c) and σ(c) values are treated as the "correct" values that correspond to quantities in the underlying production system and x', $\mu$'(c) and σ'(c) will be taken to be the estimated values obtained by Malcom. One way to constrain the solutions is to require σ'(c) to be the identity matrix for at least one value of c. This forces R=$\sigma^{-1/2}$(c), which is sufficient to prevent the determinant of R from being 0 as long as σ(c) has full rank.

Alternately, since the constraint on σ'(c) is not guaranteed to prevent a degenerate solution, a constraint on the $\mu$'(c) values can be used. For example, if $v_i$=[$\mu_i$'($c_1$) $\mu_i$'($c_2$) . . . $\mu_i$'($c_m$)], where i indexes the components of the $\mu$'(c) vector and m is the number of symbols in the vocabulary (i.e., the number of distinct VQ codes), then R can be forced to have full rank by first forcing the components of each $v_i$ to sum to 0 by subtracting the mean of the components from each component, then by using Gram-Schmidt orthogonalization to force the $v_i$ to be mutually orthogonal, and finally scaling the $v_i$ to all be length 1. If these steps are performed after each re-estimation of φ, the solutions will only differ by rotations and reflections, which are irrelevant. Of course, combinations of constraints can also be used. While using combinations of constraints will overconstrain the solution, it will also decrease the number of parameters that need to be estimated and thereby potentially lead to better solutions with limited data sets.

Returning to the problem of finding the gradient equations for the Gaussian probability density function, let ∇ denote the gradient with respect to the components of x, so $$\nabla P[x|c,\phi] = -P[x|c,\phi]\sigma^{-1}(c)[x-\mu(c)], \quad \text{Eq. 13}$$

which can be substituted into Eq. 6 to aid in finding the path that maximizes the conditional probability of the data:

$$\nabla \mathrm{Log}P[c|X,\varphi] = -\sigma^{-1}[c(t')]\{x(t')-\mu[c(t')]\} + \frac{\sum_i P[c_i]P[x(t')|c_i,\varphi]\sigma^{-1}(c_i)\{x(t')-\mu(c_i)\}}{\sum_i P[x(t')|c_i,\varphi]P[c_i]} \quad \text{Eq. 14}$$

Similarly, the gradient with respect to $\mu(c_k)$ is:

$$\nabla P[x|c_i,\varphi] = P[x|c_i,\varphi]\sigma^{-1}(c_i)[x-\mu(c_i)]\delta_{ik} \quad \text{Eq. 15}$$

$$\delta_{ik} = \begin{cases} 1 & \text{if } i = k \\ 0 & \text{if } i \neq k \end{cases}$$

Which, finally, can be substituted into Eq. 7 to get:

$$\nabla \mathrm{Log}P[c|X,\varphi] = \sum_{t\in c(t)=c_k}\sigma^{-1}[c(t)]\{x(t)-\mu[c(t)]\} - \sum_t \frac{P[c_k]P[x(t)|c_k,\varphi]\sigma^{-1}(c_k)\{x(t)-\mu(c_k)\}}{\sum_i P[x(t)|c_i,\varphi]P[c_i]} \quad \text{Eq. 16}$$

PRELIMINARY STUDIES RECOVERING MEAN ARTICULATOR POSITIONS FROM ACOUSTICS

Preliminary studies have demonstrated that a simplification of Malcom (Malcom 1) is able to learn the mapping from acoustics to articulator position using a training set composed only of acoustic data. Specifically, this experiment shows that if short windows of speech acoustics are categorized, and the assumption is made that the articulator positions used to create a given acoustic category are distributed according to a multivariate Gaussian, the mean articulator configuration associated with each acoustic category can be estimated to within a rotation, scaling, translation, and/or reflection. Put simply, this experiment shows that the pseudo-articulator paths recovered by Malcom 1 are highly correlated with measured articulator paths.

The simplifications in Malcom 1 significantly decrease training time when trying to learn the mapping from acoustics to articulation, but do not allow the direct use of Malcom 1 for estimating the conditional probability of the data. Nonetheless, learning the mapping from acoustics to articulation is considered an extremely difficult task, so the fact that Malcom 1 succeeded in learning this mapping without training on articulator measurements can be taken as an indication of the power of Malcom.

The success of the Malcom 1 algorithm also suggests that solutions obtained by Malcom 1 should be used to initialize the Malcom procedure for finding the mapping between acoustics and pseudo-articulator positions.

DATA

Speech samples were produced by a male Swedish speech scientist fluent in both Swedish and English. The speaker produced utterances containing two vowels spoken in a /g/ context with a continuous transition between the vowels, as in /guog/. The vowels in the utterances were all pairs of 9 Swedish vowels (/i/, /e/, /oe/, /a/, /o/, /u/, and the front rounded vowels /y/, //, and /P/), as well as the English vowel /E/, for a total of 90 utterances. While recording the utterances, the positions of receiver coils on the tongue, jaw, and lips were measured using an EMMA system (Perkell et al., 1992). Note that the articulator positions were only measured in order to allow comparisons between estimated and actual articulator positions, not for training Malcom.

SIGNAL PROCESSING

Spectra were recovered from 32 cepstrum coefficients of 25 ms Hamming windows of speech. These spectra were categorized into 256 categories using vector quantization and the mean articulator configuration associated with each code was calculated as discussed in the next section.

CALCULATING ACTUAL MEAN ARTICULATOR POSITIONS

While Malcom 1 estimates the mean articulator configurations without articulatory measurements, in order to compare Malcom 1's estimates of pseudo-articulator positions with the actual mean articulator configurations, it is necessary to calculate the mean articulator configurations from the articulator measurements. The mean articulator position associated with sound type 1 was found by averaging the receiver coil configurations used to produce sounds that were classified as type one. The mean articulator position was calculated for each other sound type in the same way.

ESTIMATING THE MEAN ARTICULATOR POSITIONS USING MALCOM 1

Instead of maximizing the conditional probability of the observed data, Malcom 1 recovers the mapping between acoustics and articulation by maximizing the probability of the smooth articulator paths. Mathematically, this amounts to ignoring the second term in Eqs. 14 and 16. The simplified versions of Eqs. 14 and 16 are, respectively:

$$\nabla \mathrm{Log} P[c|X,\varphi] = -\sigma^{-1}[c(t')]\{x(t')-\mu[c(t')]\} \qquad \text{Eq. 17}$$

and $$\nabla \mathrm{Log} P[c|X,\varphi] = \sum_{i} \sigma^{-1}[c(t)]\{x(t)-\mu[c(t)]\} \qquad \text{Eq. 18}$$

Notice that Eq. 18 is significantly simpler to maximize than Eq. 16. Eq. 16 requires an iterative maximization algorithm whereas Eq. 18 can be solved analytically. The analytic solution for Eq. 18 sets $$\mu(c_i) = \frac{\sum_{t \ni c(t)=c_i} x(t)}{n_i} \qquad \text{Eq. 19}$$

P(c) is not calculated in Malcom 1 because no information about P(c) can be extracted without trying to maximize the conditional probability of the data instead of the probability of the smooth paths. For this study, all the covariance matrices were set to the identity matrix.

The degeneracy problem is much worse when using Malcom 1 than it is when using Malcom. The problem is worse because Malcom 1 maximizes the probability of the smooth paths, and as discussed above, these probabilities go to infinity as the determinant of R goes to 0. Thus, without imposing constraints, Malcom 1 will return degenerate solutions if allowed to run indefinitely. In the following description, all the covariance matrices were constrained to be identity matrices and the means were constrained with centering, orthogonalizing, and scaling, as discussed above.

COMPARING ESTIMATED TO ACTUAL MEAN ARTICULATOR CONFIGURATIONS

One way to determine whether the estimates of the mean articulator positions in a maximum likelihood continuity mapping supply information about the actual mean articulator positions is to see whether equations can be constructed giving the actual mean positions from the estimated mean positions. In order for the mean articulator position estimates to be useful, the equations should be simple. This experiment focused on linear functions of the form:

$$\hat{A}_{ic} = \sum_{d=1}^{D} \alpha_{id} m_{dc} + k_i \qquad \text{with } \varepsilon_{ic} = A_{ic} - \hat{A}_{ic} \qquad \text{Eq. 20}$$

where:

$\hat{A}_{ic}$ is the mean position of the receiver coil i for sounds of type c as estimated by the linear equation, $A_{ic}$ is the actual mean position of the receiver coil i for sounds of type c, D is the number of dimensions in the Malcom 1 solution, $m_{dc}$ is the position of code c on the $d^{th}$ dimension of the Malcom 1 solution.

The other parameters, $\alpha_{id}$ and $k_i$, are values that will minimize the sum of the squared error terms. An equation of this form is particularly interesting because solving for the unknown $\alpha_{id}$ and $k_i$ values is equivalent to finding axes in the Malcom 1 solution that correspond most closely to the articulator positions, essentially compensating for the fact that the Malcom 1 solution can be rotated, scaled, translated, or reflected with respect to the actual articulator positions.

The $\alpha_{id}$ and $k_i$ values that minimize the sum of the squared error terms are found using standard multiple regression techniques . Multiple regression also gives a quantitative measure of the extent to which the equation is accurate, namely, the multiple regression r value.

Figure 3:
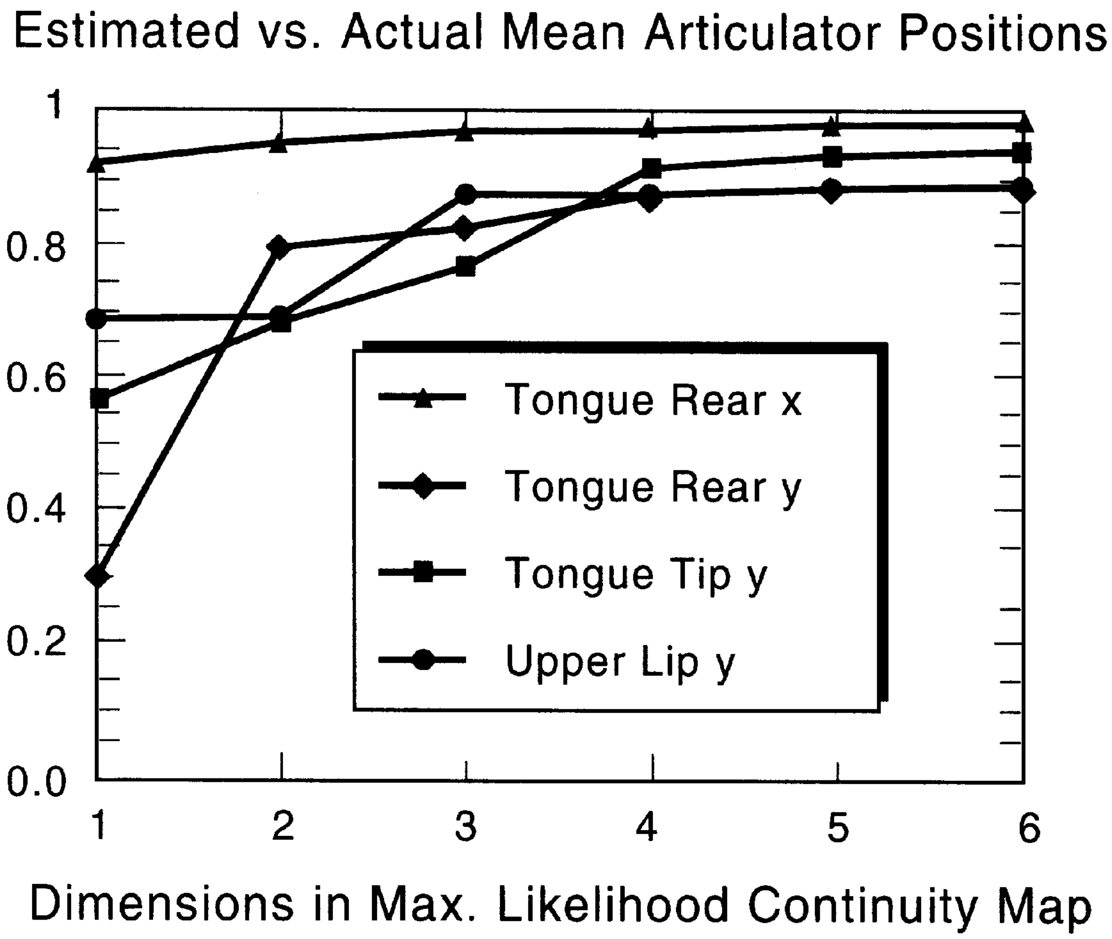
FIG. 3 graphically depicts a comparison between actual mean articulator positions and the pseudo-articulator positions estimated using the process of the present invention.

FIG. 3 shows the multiple regression r values obtained when trying to relate the positions of codes in the maximum likelihood continuity mapping to the mean articulator positions of three key articulators—the tongue rear (x and y positions), the tongue tip (y position) and the upper lip (y position). FIG. 3 shows that a four dimensional Malcom 1 solution is sufficient to capture much of the information about the mean articulator positions, and that Malcom 1 solutions with more than four dimensions do only slightly better than a four dimensional solution. FIG. 3 also shows that tongue body positions can be recovered surprisingly accurately (Pearson r values of around 95%).

USING MEAN ARTICULATOR CONFIGURATIONS TO ESTIMATE ACTUAL ARTICULATOR CONFIGURATIONS

The mean of all the articulator configurations used to produce an acoustic segment is not necessarily a good estimate of the actual articulator configuration used to produce a segment. For example, if two very different articulator positions (call the positions 1 and 2) create the same acoustic signal (call it signal type 3), but articulator configurations between positions 1 and 2 produce different signals, then the average articulator configuration will not even be among those that create signal type 3. However, since both acoustic and articulator measurements are available in the data set, it is possible to determine whether the mean articulator positions are good estimates of the actual articulator positions. In short, the mean articulator positions are good estimates of the actual articulator positions for this data set; root mean squared error values for points on the tongue were less than 2 mm (Hogden et al., 1996). Of course, articulation positions can be recovered more accurately from acoustics when a small articulator motion creates a large change in acoustics, e.g. near constrictions.

MALCOM FOR SPEECH RECOGNITION STATISTICAL SPEECH RECOGNITION

Malcom can be used for speech recognition: first make a mapping from speech sounds to articulator positions, then determine articulator paths that best predict acoustic sequences associated with each word (or phoneme, or diphone, triphone, etc.), and finally, given a new utterance, find the word (diphone, triphone, etc.) model that maximizes the probability of the acoustics. The invention described herein includes a technique for finding the smooth pseudo-articulator path that maximizes the probability of a single acoustic sequence, and so could be used to find word models given one acoustic sequence per word. The advantage of this approach to speech recognition is that it would be relatively easy to replace the HMMs currently used with the Malcom approach.

Speech recognition is already a 500 million to 1 billion dollar/year industry, despite limitations of the current tools. A sufficiently good speech recognition technique could completely change the way people interact with computers, possibly doubling the input rate, since the number of words spoken per minute is more than double the average typing rate.

USING PSEUDO-ARTICULATORY FEATURES AS INPUT TO CURRENT SPEECH RECOGNITION DEVICES

An even simpler way to use Malcom to improve speech recognition is to use the pseudo-articulator positions recovered by Malcom, alone or in addition to acoustics, as input to current speech recognition devices. This approach could be used not only for the various versions of HMM's, but also for knowledge based approaches to speech recognition, (Liu, 1996). Knowledge-based approaches attempt to find invariant features of acoustics associated with the various phonemes, and also to locate portions of speech that correspond to phonemes and portions that correspond to phoneme transitions. While researchers have remained unsuccessful at finding invariant features in acoustics, invariant articulator features are already known for many phonemes (e.g. /m/ is made by closing the lips and opening the velum). So by applying current techniques to recovered pseudo-articulator paths, knowledge-based speech recognition should be improved.

OTHER SPEECH/LANGUAGE APPLICATIONS OF MALCOM

Improving speech recognition is an admirable goal in itself. But, the impact of Malcom extends far beyond speech recognition. Malcom is a relatively general statistical technique that has a variety of potential speech applications.

SPEAKER RECOGNITION

Malcom should also improve speaker verification/identification algorithms, since techniques used for speaker verification are very similar to those used for speech recognition. To use Malcom for speaker recognition, different mappings from acoustics to articulation would be made for each speaker. The likelihood that any given speaker produced a new speech sample could be calculated using the technique described above. For speaker identification, the speaker most likely to have produced the speech signal would be chosen. For speaker verification, the speaker would be verified if the likelihood of producing the speech was sufficiently high or if it was higher than some cohort set.

High performance speaker recognition would not only have a wide variety of commercial uses (e.g. preventing unauthorized telephone access to bank accounts) but could be important for controlling access to classified information. The advantage of using voice characteristics to verify identity is that voice characteristics are the only biometric data that are typically transmitted over phone lines.

SPEECH SYNTHESIS

Recent results show that HMMs can be used to produce high quality synthesized speech. However, since the HMM model of speech transitions is unrealistic, Malcom can be used in much the same way as HMMs to produce higher quality synthesized speech.

In addition, since it should be easier to describe words in terms of the articulator motions that produce the words than by describing the sound waves that are produced, Malcom may simplify the user interface for speech synthesizers. For example, a pseudo-articulator path could be input to a speech synthesizer and Malcom-derived mapping used to map the pseudo-articulator positions to acoustics to produce synthesized speech.

SPEECH CODING

Malcom could also be used to decrease the number of bits needed to transmit speech, that is, Malcom can be used for speech coding. For example, a person could talk into a phone, have their speech converted to a pseudo-articulator path, transmit the pseudo-articulator path and some additional bits, and have the pseudo-articulator path and the additional bits converted back to speech at the receiver. This could be of great value because transmitting bits can be expensive and it would take more bits to transmit a voice than to transmit pseudo-articulator trajectories.

The number of bits needed to transmit a pseudo-articulator trajectory can be estimated by comparison to other speech coding techniques. Consider that the position of a single articulator can be transmitted using about 30 samples/second and the range of articulator positions is much smaller than the range of amplitudes found in acoustic signals. So assume that about 5 bits per sample are needed (similar to what is needed for LPC coefficients) for the tongue body x and y coordinates, the tongue tip, and for two lip parameters, but only 1 bit per sample for the velum (it is either opened or closed). Further assume that about 600 bits/second are needed to transmit pitch, voicing, and gain information (as in the 2.4 kbit/second U.S. Government Standard LPC-10). This gives an estimate of about 1380 bits/second, or about 40% less than the 2.4 kbit/second U.S. Government Standard LPC-10.

In order to accurately recover the VQ codes given the transmitted pseudo-articulator trajectories, it will be necessary to transmit bits in addition to the pseudo-articulator paths. However, the pseudo-articulator paths found by Malcom are optimal in that they require the fewest additional bits. This can be seen from information theory, which shows that the number of bits that must be transmitted in addition to the pseudo-articulator paths (or even the measured articulator paths) is, assuming we can send large blocks of speech:

$$\text{bits} = -\sum_{i} \text{Log}P[c(t)|x(t), \varphi] \qquad \text{Eq. 21}$$

Since $$\sum_{i} \text{Log}P[c(t)|x(t), \varphi]$$

is maximized by Malcom, the number of bits is minimized.

Such an application is likely to be particularly valuable in satellite communication. To judge the value, consider that the INMARSAT (A) provides communications service at a rate of $39.00 per kbps-hour, based on figures provided in a January 1996 AFCEA (102) on Military Satellite Communications. Arbitrarily, for only six hours of voice communication per day for a year at 2400 bps, the cost of this service is $204,984. This estimate is for only one voice channel. Even a relatively moderate (say 20%) decrease in the number of bits per second needed to transmit speech would be worth approximately $40,000 per voice channel per year. Furthermore, judging from recent experiments with speech synthesis, speech reconstructed using this technique is likely to be higher quality than the government standard.

VOICE MIMICRY

It may be possible to have a person speak into a computer, convert the speech sounds to articulator trajectories, and then synthesize a different person's voice with trajectories from the first person, essentially allowing one person to talk into a machine and have another person's voice come out of the machine. This could have a wide variety of potential entertainment uses, and should be considered when evaluating the efficacy of speaker verification systems.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A computer implemented method for compact speech representation comprising the steps of:

(a) initializing parameters of a probabilistic mapping between codes that represent speech sounds and a continuity map;

(b) training the parameters of the probabilistic mapping, comprising the steps of:

(1) inputting a first set of training speech sounds;

(2) representing the first set of training speech sounds as a temporal sequence of the codes;

(3) defining a first path through the continuity map for the sequence of codes, where the probablistic mapping defines a conditional probability of the sequence of codes given the first path;

(4) finding a smooth path through the continuity map that maximizes the conditional probability of the sequence of codes;

(5) repeating steps (b)(1)–(b)(4) over additional training speech sounds:

(6) given the smooth paths that represent the sets of training speech sounds, adjusting the probabilistic mapping parameters to increase the conditional probability of the sequences of the codes;

(c) inputting a new set of speech sounds;

(d) representing the new set of speech sounds by a related sequence of the codes;

(e) determining a new smooth path through the continuity map that maximizes the conditional probability of the sequence of codes given the new smooth path; and (f) outputting the continuity map coordinates of the most probable smooth path determined in step (e) as the compact representation of the new set of speech sounds.

2. A method according to claim 1, wherein the smooth path is constrained to paths that satisfy selected biologically plausible constraints for producing the speech sounds.

3. A computer implemented method for speech recognition comprising the steps of:

(a) initializing parameters of a probabilistic mapping between codes that represent speech sounds and a continuity map;

(b) training the parameters of the probabilistic mapping, comprising the steps of:

(1) inputting a first set of training speech sounds;

(2) representing the first set of training speech sounds as a temporal sequence of the codes;

(3) defining a first path through the continuity map for the sequence of codes, where the probablistic mapping defines a conditional probability of the sequence of codes given the first path;

(4) finding a smooth path through the continuity map that maximizes the conditional probability of the sequence of codes;

(5) repeating steps (b)(1)–(b)(4) over additional training speech sounds;

(6) given the smooth paths that represent the sets of training speech sounds, adjusting the probabilistic mapping parameters to increase the conditional probability of the sequences of the codes;

(c) inputting a new set of speech sounds;

(d) representing the new set of speech sounds by a related sequence of the codes;

(e) determining the probability of the sequence of codes representing the new speech sounds given the smooth path that maximizes the path of the code sequences for the training speech sounds;

(f) identifying the smooth path having the maximum probability for the sequence of the new set of speech sounds; and (g) outputting the maximum probability value as an indicia of recognition of the sequence of new speech sounds.

4. A method according to claim 3, further including the steps of:

collecting the training speech sounds from a known speaker according to a known sequence of words;

collecting the new speech sounds from an unknown speaker; and outputting the maximum probability value as an indicia that the unknown speaker is the same as the known speaker.

5. A computer implemented method for compact speech representation comprising the steps of:

(a) initializing parameters of a probabilistic mapping between codes that represent speech sounds and a continuity map;

(b) training the parameters of the probabilistic mapping, comprising the steps of:

(1) inputting a first set of training speech sounds;

(2) representing the first set of training speech sounds as a temporal sequence of the codes;

(3) defining a first path through the continuity map for the sequence of codes, where the probablistic mapping defines a conditional probability of the sequence of codes given the first path;

(4) finding a smooth path through the continuity map that maximizes the probability of the path through the continuity map given the sequence of codes;

(5) repeating steps (b)(1)–(b)(4) over additional training speech sounds:

(6) given the smooth paths that represent the sets of training speech sounds, adjusting the probabilistic mapping parameters to increase the probability of the path through the continuity map given the sequences of the codes;

(c) inputting a new set of speech sounds;

(d) representing the new set of speech sounds by a related sequence of the codes;

(e) determining a new smooth path through the continuity map that maximizes the conditional probability of the sequence of codes given the new smooth path; and (f) outputting the continuity map coordinates of the most probable smooth path determined in step (e) as the compact representation of the new set of speech sounds.

6. A method according to claim 5, wherein the smooth path is constrained to paths that satisfy selected biologically plausible constraints for producing the speech sounds.

7. A computer implemented method for speech recognition comprising the steps of:

(a) initializing parameters of a probabilistic mapping between codes that represent speech sounds and a continuity map;

(b) training the parameters of the probabilistic mapping, comprising the steps of:

(1) inputting a first set of training speech sounds;

(2) representing the first set of training speech sounds as a temporal sequence of the codes;

(3) defining a first path through the continuity map for the sequence of codes, where the probablistic mapping defines a conditional probability of the sequence of codes given the first path;

(4) finding a smooth path through the continuity map that maximizes the conditional probability of the sequence of codes;

(5) repeating steps (b)(1)–(b)(4) over additional training speech sounds:

(6) given the smooth paths that represent the sets of training speech sounds, adjusting the probabilistic mapping parameters to increase the conditional probability of the sequences of the codes;

(c) inputting a new set of speech sounds;

(d) representing the new set of speech sounds by a related sequence of the codes;

(e) determining the probability of the sequence of codes representing the new speech sounds given the smooth path that maximizes the path of the code sequences for the training speech sounds;

(f) identifying the smooth path having the maximum probability for the sequence of the new set of speech sounds; and (g) outputting the maximum probability value as an indicia of recognition of the sequence of new speech sounds.

8. A method according to claim 7, further including the steps of:

collecting the training speech sounds from a known speaker according to a known sequence of words;

collecting the new speech sounds from an unknown speaker; and outputting the maximum probability value as an indicia that the unknown speaker is the same as the known speaker.

* * * * *